(12) United States Patent
Ainger et al.

(10) Patent No.: US 12,502,343 B2
(45) Date of Patent: Dec. 23, 2025

(54) HAIR TREATMENT COMPOSITION

(71) Applicant: Conopco, Inc., Englewood Cliffs, NJ (US)

(72) Inventors: Nicholas John Ainger, Wirral (GB);
Luisa Zoe Collins, Chester (GB);
Stephen Golding, Northwich (GB);
Louise Jannette Roberts, Ellesemere Port (GB)

(73) Assignee: Conopco, Inc., Englewood Cliffs, NJ (US)

( * ) Notice: Subject to any disclaimer, the term of this patent is extended or adjusted under 35 U.S.C. 154(b) by 737 days.

(21) Appl. No.: 17/629,908

(22) PCT Filed: Jul. 23, 2020

(86) PCT No.: PCT/EP2020/070892
§ 371 (c)(1),
(2) Date: Jan. 25, 2022

(87) PCT Pub. No.: WO2021/018747
PCT Pub. Date: Feb. 4, 2021

(65) Prior Publication Data
US 2023/0346668 A1   Nov. 2, 2023

(30) Foreign Application Priority Data
Jul. 26, 2019  (EP) .................................... 19188726

(51) Int. Cl.
*A61K 8/46*        (2006.01)
*A61K 8/06*        (2006.01)
*A61K 8/49*        (2006.01)
*A61K 8/81*        (2006.01)
*A61K 8/898*       (2006.01)
*A61Q 5/00*        (2006.01)
*A61Q 5/02*        (2006.01)

(52) U.S. Cl.
CPC ............ *A61K 8/4926* (2013.01); *A61K 8/062* (2013.01); *A61K 8/463* (2013.01); *A61K 8/817* (2013.01); *A61Q 5/006* (2013.01); *A61Q 5/02* (2013.01)

(58) Field of Classification Search
None
See application file for complete search history.

(56) References Cited

U.S. PATENT DOCUMENTS

| 6,113,892 A | 9/2000 | Newell et al. |
| 6,177,511 B1 * | 1/2001 | Dauth .................... C08G 77/54 524/157 |
| 6,335,312 B1 | 1/2002 | Coffindaffer et al. |
| 2003/0157049 A1 * | 8/2003 | Gawtrey ................. C08L 83/08 424/70.122 |
| 2013/0059929 A1 | 3/2013 | Koehler et al. |
| 2016/0213588 A1 | 7/2016 | Polidano et al. |
| 2017/0304182 A1 | 10/2017 | Kadir et al. |
| 2018/0311135 A1 | 11/2018 | Chang et al. |
| 2018/0311136 A1 | 11/2018 | Chang et al. |
| 2019/0000735 A1 * | 1/2019 | Kelly ....................... A61Q 5/00 |

FOREIGN PATENT DOCUMENTS

| CN | 105473125 A | 4/2016 |
| DE | 102012203240 | 3/2013 |
| EP | 0941061 | 7/2002 |
| EP | 2605832 A1 | 6/2013 |
| FR | 2996770 A1 | 4/2014 |
| JP | H04108724 A | 4/1992 |
| JP | 2001519376 A | 10/2001 |
| JP | 2006316035 A | 11/2006 |
| JP | 2007001953 A | 1/2007 |
| JP | 2013518831 A | 5/2013 |
| JP | 2016507562 A | 3/2016 |
| JP | 2020513000 A | 4/2020 |
| JP | 2020517669 A | 6/2020 |
| WO | 2014056962 A2 | 4/2014 |
| WO | 2014124067 A1 | 8/2014 |

OTHER PUBLICATIONS

Shang Mei Int. Cosmetics; Anti Dandruff shampoo, Record ID 4135981; Database GnpdMintel; Jul. 12, 2016; pp. 1-3. (Year: 2016).*
Suzhou Shangmei International Cosmetics Co., Ltd, "Doux Damage Repair Anti-dandruff Shampoo, Domestic Non-special Use Cosmetics Record Service Platform," https://hzpba.nmpa.gov.cn/gccx/chakanHis.html?prodId=20160328135113gfz22&gb=G, dated Mar. 31, 2016, with Machine Translation.
Search Report and Written Opnion in EP19188726; Dec. 19, 2019.

(Continued)

*Primary Examiner* — Brian Gulledge
(74) *Attorney, Agent, or Firm* — Carter, DeLuca & Farrell, LLP; George Likourezos; Bret P. Shapiro

(57) ABSTRACT

A hair treatment composition comprising: i) a cleansing phase comprising a surfactant, in which at least 50 wt % of the total surfactant comprises an ethoxylated alkyl sulphate anionic surfactant; ii) an oil-in-water emulsion comprising a silicone; iii) a piroctone compound at a level of 0.15 to 1.5 wt % of the composition; and iv) a cationic polymer in which the cationic polymer comprises a dimethyl diallyl ammonium moiety, at a level of 0.1 to 1.0 wt % of the composition; wherein the anti-dandruff agent component in the composition is less than 50 wt % in solid form.

12 Claims, No Drawings

(56) References Cited

OTHER PUBLICATIONS

Shang Mei Int. Cosmetics; Anti Dandruff shampoo, Record ID 4135981; Database Gnpd Mintel; Jul. 12, 2016; pp. 1-3.
Run Jie Daily Chemicals ; Volumizing Anti Dandruff Shampoo, Record ID 6678859; Mintel Gnpd; Jul. 3, 2019; pp. 1-3, XP55651549.
Mintel Gndp, Shang Mei Int. Cosmetics; Anti Dandruff Shampoo, Record ID 4135981; Ultra Doux Repairing Advocado oil and Shea Butter; Jul. 12, 2016; pp. 1-3.
Search Report and Written Opinion in PCTEP2020070892; Oct. 20, 2020; World Intellectual Property Org. (WIPO).
Written Opinion 2 in PCTEP2020070892; Jun. 15, 2021; World Intellectual Property Org. (WIPO).

* cited by examiner

HAIR TREATMENT COMPOSITION

CROSS-REFERENCE TO RELATED PATENT APPLICATIONS

This application is a U.S. National Phase Application under 35 U.S.C. § 371 of International Application No. PCT/EP2020/070892, filed Jul. 23, 2020, which claims the benefit of and priority to EP19188726.4, filed on Jul. 26, 2019, both of which are incorporated herein by reference in their entireties.

FIELD OF THE INVENTION

The present invention relates to a hair treatment composition, particularly an anti-dandruff shampoo composition.

BACKGROUND OF THE INVENTION

Dandruff is a problem affecting many globally. The condition is manifested by the shedding of clumps of dead skin cells from the scalp. These are white in colour and provide an aesthetically displeasing appearance. Factors that contributes to dandruff are certain members of the Malassezia yeasts. To combat these, hair treatment compositions are developed including various actives for their antidandruff effectiveness. Piroctone compounds such as piroctone olamine is one such active.

A common problem with piroctone compounds is that their deposition onto the hair or scalp during the wash process is difficult. This is particularly the case when effective anionic cleansing surfactants such as sodium laureth sulphate are present in the composition. During the excessive rinsing process, the majority of piroctone is likely to be washed away together with the surfactants. Poor deposition is correlated with low antidandruff activity, thus little mitigation of the ill-effects of dandruff. To date, there are attempts to offset this drawback by increasing the level of piroctone olamine in hair treatment composition. Such an approach causes a variety of issues such as increased costs, potential instability of the formulation and potential adverse effect to hair sensory properties. Hence it is not an approach favoured by the industry.

DE102012203240A1 describes hair treatment composition with increased antidandruff effect and improved combing, gloss, elasticity of hair. The composition includes antidandruff agent selected from zinc pyrithione, climbazole, Octopirox, ketoconazol, selenium disulphide, selenium containing vegetable oil, selenium containing plant extract, and a cationic amino silicone. Examples include shampoos and conditioners comprising Octopirox® (Piroctone Olamine), amino silicone and surfactants.

US2013/0059929A1 describes a cosmetic or dermatological preparation, in which the preparation comprises at least one of benzethonium chloride, methylisothiazolinone, piroctone olamine, and lauroyl ethyl arginate, and does not contain a preservative that comprises a phenolic group. The preparations show improved sensory properties and sufficient microbiological stability.

EP0941061 describes a hair shampoo, comprising: surfactant, polyethylenimine, and piroctone olamine. The presence of polyethylenimine in the composition is said to enhances the deposition of the active piroctone olamine onto the hair and skin.

Various commercial products allegedly sold under the brand names "Ultra Doux" and "Nak" in China between 2016 and 2019 are alleged to contain inter alia lauryl ether sulphate surfactant, betaine surfactant, piroctone olamine, polyquaternium-6 and amodimethicone. However in particular in the case of the Nak product, it is not clear that the commercial availability of the product predates the priority date of this patent application.

The listing or discussion of an apparently prior-published document in this specification should not necessarily be taken as an acknowledgement that the document is part of the state of the art or is common general knowledge.

Despite the prior art, there remains a need to improve the deposition of piroctone compounds, especially piroctone acid or piroctone olamine, onto the surface of scalp and/or hair during washing process. There also remains a further need to improve the deposition onto the hair and/or scalp without adverse effecting the cleansing and conditioning performance.

The present invention addresses one or more needs described hereinbefore.

SUMMARY OF THE INVENTION

In a first aspect of the present invention, there is provided a hair treatment composition comprising:
 i) a cleansing phase comprising a surfactant, in which at least 50 wt % of the total surfactant comprises an ethoxylated alkyl sulphate anionic surfactant;
 ii) an oil-in-water emulsion comprising a silicone;
 iii) a piroctone compound; and
 iv) a cationic polymer in which the cationic polymer comprises a dimethyl diallyl ammonium moiety.

In a second aspect of the present invention, there is provided a non-therapeutic method of treating hair or the scalp, comprising application of the hair treatment composition as described above to the hair or scalp.

In the context of the present invention the term 'antidandruff activity' should be understood to mean the effect of prevent, control, reduce or limit human dandruff.

The term 'hair treatment composition' should be understood to mean a composition for topical application to hair and/or scalp of mammals, preferably humans. Such a composition may be in the form of a liquid, lotion, cream, foam, scrub, gel or bar. Non-limiting examples of such compositions include hair lotions, creams, shampoos, serums, or conditioners. Preferably, the hair treatment composition is an anti-dandruff hair shampoo.

DETAILED DESCRIPTION OF THE INVENTION

Any feature stated as 'preferred' in one aspect of the invention should be understood to be a preferred feature in the other aspect of the invention. Any feature described as 'preferred' should be understood to be particularly preferred in combination with a further preferred feature or features.

Any feature of a particular embodiment of the present invention may be utilized in, and be regarded as being disclosed in combination with, any other embodiment of the invention.

All weight percentages (wt %) are based upon the final weight of the composition unless indicated otherwise. Numerical ranges expressed in the format 'x-y' are understood to include x and y, unless specified otherwise. The numbers can be qualified by the term 'about'. When for a specific feature multiple preferred ranges are described in the format 'from x to y', it is understood that all ranges combining the different endpoints are also contemplated.

Hair Treatment Composition

The composition preferably comprises a cosmetically acceptable carrier. By 'cosmetically acceptable carrier' is meant a carrier that is compatible with hair, skin, integuments or mucous membranes, not causing any unacceptable discomfort liable to discourage the consumer from using the composition. The preferred carrier is water.

The preferred format of the composition is an antidandruff shampoo. The anti-dandruff shampoo may suitably comprise from 50 to 90%, preferably from 60-80% water by weight of the total shampoo.

Cleansing Phase

The cleaning phase comprises one or more cleansing surfactants. The cleansing surfactants refer to those which act to cleanse hair and/or scalp. The total level of cleansing surfactants is preferably from 3 to 45%, more preferably from 5 to 25%, most preferably from 7 to 20% by weight of the total composition.

Preferably, the cleansing surfactant comprises an anionic surfactant. The anionic surfactant comprises ethoxylated alkyl sulphate anionic surfactant.

Preferred alkyl ether sulphates are those of formula (I):

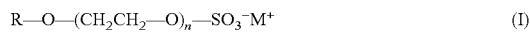

$$R-O-(CH_2CH_2-O)_n-SO_3^-M^+ \qquad (I)$$

in which R is a straight or branched alkyl chain having 8 to 18 (preferably 12 to 18) carbon atoms; n is the average degree of ethoxylation and ranges from 0.5 to 3 (preferably from 1 to 3); and M is a solubilizing cation such as sodium, potassium, ammonium or substituted ammonium. An example is sodium lauryl ether sulphate (SLES). The most preferred example is SLES having an average degree of ethoxylate of from 0.5 to 3, preferably from 1 to 3.

The preferred level of such surfactant is from 2 to 20% by weight of the total composition, more preferably from 8 to 15 wt %.

Other surfactants may be present in the composition, such as alkyl sulphates. Preferred alkyl sulphates are $C_{8-18}$ alkyl sulphate, more preferably $C_{12-18}$ alkyl sulphate, preferably in the form of a salt with a solubilising cation such as sodium, potassium, ammonium or substituted ammonium. Examples are sodium lauryl sulphate (SLS) or sodium dodecyl sulphate (SDS).

The cleansing phase may comprise one or more further anionic surfactants which are cosmetically acceptable and suitable for topical application to hair and/or scalp. Examples of further anionic surfactants include alkyl sulphonates, alkyl succinates, alkyl sulphosuccinates, alkyl ether sulphosuccinates, N-alkyl sarcosinates, alkyl phosphates, alkyl ether phosphates, and alkyl ether carboxylic acids and salts thereof, especially their sodium, magnesium, ammonium and mono-, di- and triethanolamine salts. The alkyl ether sulphosuccinates, alkyl ether phosphates and alkyl ether carboxylic acids and salts thereof may contain from 1 to 20 ethylene oxide or propylene oxide units per molecule.

Typical anionic cleansing surfactants for use in shampoo compositions according to the present invention include sodium oleyl succinate, ammonium lauryl sulphosuccinate, sodium lauryl ether sulphosuccinate, sodium dodecylbenzene sulphonate, triethanolamine dodecylbenzene sulphonate, lauryl ether carboxylic acid and sodium N-lauryl sarcosinate, lauric monoglyceride sodium sulphate, sodium lauryl sulphate, sodium laureth sulphate, sodium cocyl sulphate, sodium cocoyl isethionate and mixtures thereof.

The composition can include co-surfactants, to help impart aesthetic, physical or cleansing properties to the composition. The co-surfactant is preferably comprised in the cleansing phase of the composition. An example of a co-surfactant is a nonionic surfactant, which can be included in an amount ranging from 0.5 to 10%, preferably from 2 to 8%, more preferably from 1 to 5% by weight of the total composition.

For example, representative nonionic surfactants that can be included in the treatment compositions, preferably shampoo compositions of the invention include condensation products of aliphatic ($C_8$-$C_{18}$) primary or secondary linear or branched chain alcohols or phenols with alkylene oxides, usually ethylene oxide and generally having from 6 to 30 ethylene oxide groups. Other representative nonionic surfactants include mono- or di-alkyl alkanolamides. Examples include coco mono- or di-ethanolamide and coco mono-isopropanolamide.

Further nonionic surfactants which can be included are the alkyl polyglycosides (APGs). Typically, the APG is one which comprises an alkyl group connected (optionally via a bridging group) to a block of one or more glycosyl groups. Preferred APGs are defined by the following formula (II):

$$R'O-(G)_k \qquad (II)$$

in which R' is a branched or straight chain alkyl group which may be saturated or unsaturated and G is a saccharide group. R' may represent a mean alkyl chain length of from about $C_5$ to about $C_{20}$. Preferably R' represents a mean alkyl chain length of from about $C_8$ to about $C_{12}$. Most preferably the value of R' lies between about 9.5 and about 10.5. G may be selected from $C_5$ or $C_6$ monosaccharide residues and is preferably a glucoside. G may be selected from the group comprising glucose, xylose, lactose, fructose, mannose and derivatives thereof. Preferably G is glucose. The degree of polymerisation, k, may have a value of from about 1 to about 10 or more; preferably, the value of k lies from about 1.1 to about 2; most preferably the value of m lies from about 1.3 to about 1.5. Suitable alkyl polyglycosides for use in the invention are commercially available and include for example those materials identified as: Oramix NS10 ex. Seppic; Plantaren 1200 and Plantaren 2000, ex. Henkel.

Other sugar-derived nonionic surfactants which can be included in compositions (preferably shampoos) of the invention include the $C_{10}$-$C_{18}$ N-alkyl ($C_1$-$C_6$) polyhydroxy fatty acid amides, such as the $C_{12}$-$C_{18}$ N-methyl glucamides, as described for example in WO 92/06154 and U.S. Pat. No. 5,194,639, and the N-alkoxy polyhydroxy fatty acid amides, such as $C_{10}$-$C_{18}$ N-(3-methoxypropyl) glucamide.

A preferred example of a co-surfactant is an amphoteric or zwitterionic surfactant, which can be included in an amount ranging from 0.5 to about 10 wt. %, preferably from 2 to 8, more preferably from 1 to 5% by weight of the total composition.

Examples of amphoteric or zwitterionic surfactants include alkyl amine oxides, alkyl betaines, alkyl amidopropyl betaines, alkyl sulphobetaines (sultaines), alkyl glycinates, alkyl carboxyglycinates, alkyl amphoacetates, alkyl amphopropionates, alkylamphoglycinates, alkyl amidopropyl hydroxysultaines, acyl taurates and acyl glutamates, in which the alkyl and acyl groups have from 8 to 22 carbon atoms. Typical amphoteric and zwitterionic surfactants for use in shampoos of the invention include lauryl amine oxide, cocodimethyl sulphopropyl betaine, lauryl betaine, cocamidopropyl betaine and sodium cocoamphoacetate.

A particularly preferred amphoteric or zwitterionic surfactant is an amidobetaine amphoteric surfactant of general formula (III):

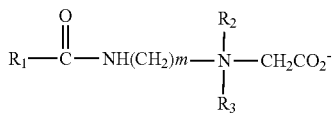

in which m is 2 or 3; $R^1C(O)$ is selected from linear or branched, saturated or unsaturated acyl groups having from 8 to 22 carbon atoms and mixtures thereof; and $R^2$ and $R^3$ are each independently selected from alkyl, hydroxyalkyl or carboxyalkyl groups having from 1 to 6 carbon atoms and mixtures thereof. An example is cocamidopropyl betaine. The preferred level of such surfactant is from 0.5-10% by weight of the total composition, more preferably from 2-8 wt %, most preferably from 1-5 wt %.

A further optional but preferred surfactant is an alkyl glycinate and/or alkyl carboxyglycinate. If present, it is present at a level of from 1 to 8 wt. %, preferably 2 to 6 wt %.

Preferably the alkyl glycinate and/or alkyl carboxyglycinate has an alkyl group of from $C_{8-22}$ carbon atoms, in the form of a salt with a solubilizing cation such as sodium, potassium, ammonium or substituted ammonium. Preferred glycinates are sodium coco glycinate and sodium cocoyl glycinate.

Mixtures of any of the foregoing amphoteric or zwitterionic surfactants may also be suitable. Preferred mixtures are those of cocamidopropyl betaine with further amphoteric or zwitterionic surfactants as described above. A preferred further amphoteric or zwitterionic surfactant is sodium cocoamphoacetate.

In preferred embodiments, the cleansing phase comprises an alkyl sulphate and/or ethoxylated alkyl sulphate anionic surfactant, preferably present at level of 8 to 15% by weight of the total composition; and a betaine surfactant, preferably an alkyl amidopropyl betaine, which can preferably be present at a level of 1 to 5% by weight of the total composition.

The total amount of surfactants (inclusive of any co-surfactants) in a hair treatment composition, is generally from 1 to 50 wt. %, preferably from 2 to 40 wt. %, more preferably from 10 to 25 wt. % by weight of the total composition.

Piroctone Compound

The piroctone compound for use in the present invention may include piroctone acid, primary, secondary and tertiary olamine salts of piroctone acid (such as the diethanolamine and triethanolamine salts), and mixtures thereof, preferably piroctone acid, primary olamine salt of piroctone acid (i.e. piroctone olamine, also known as Octopirox®) and mixtures thereof, The piroctone compound useful in the present invention typically contains the structure defined by formula (IV):

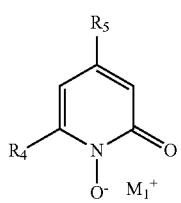

wherein $R_4$ is selected from C1-C17 hydrocarbon radicals, $R_5$ is selected from C1-4 alkyl, C2-4 alkenyl or alkynyl, hydrogen, phenyl or benzyl, and $M_1$ is selected from hydrogen, monoethanolamine (MEA), diethanolamine (DEA), or triethanolamine (TEA).

Preferred $R_4$ group is $(CH_3)_3CCH_2CH(CH_3)CH_2$— and preferred $R_5$ is a methyl. More preferably, $R_4$ is $(CH_3)_3CCH_2CH(CH_3)CH_2$—, $R_5$ is a methyl and $M_1$ is a hydrogen or MEA. Most preferably, $R_4$ is $(CH_3)_3CCH_2CH(CH_3)CH_2$—, $R_5$ is a methyl and $M_1$ is monoethanolamine.

Piroctone olamine is particularly preferred.

The piroctone compound used in the compositions acts as an anti-dandruff agent. In compositions and methods according to the invention, it is typically in dissolved form.

The typical level of the piroctone compound is from 0.01 to 5% by weight of the total composition, preferably from 0.05 to 2 wt %, more preferably from 0.1 to 1.5 wt %. In some embodiments, it may be from 0.2 to 0.75 wt %.

The typical level of the piroctone compound is from 0.1 to 20% by weight of the total emulsion, preferably from 1 to 10 wt %, more preferably from 1 to 5 wt %.

In a preferred embodiment, the anti-dandruff agent component in the compositions of the invention is less than 50 wt % solid form (e.g. particulate), e.g. at least 50 wt % of the anti-dandruff component in the composition is in dissolved form. Conveniently less than 40 wt % of the anti-dandruff component is in solid form (e.g. at least 60 wt % of the anti-dandruff component may be in dissolved form), conveniently less than 30 wt % is in solid form (e.g. at least 70 wt % may be in dissolved form), conveniently less than 20 wt % is in solid form (e.g. at least 80 wt % may be in dissolved form), conveniently less than 10 wt % is in solid form (e.g. at least 90 wt % may be in dissolved form). In certain embodiments, the composition may be essentially free of solid anti-dandruff agent, such as zinc pyrithione, e.g. essentially all of the anti-dandruff component of the compositions may be in dissolved form.

Oil-In-Water Emulsion

The oil-in-water emulsion is an essential feature of the present invention.

The aqueous phase of the emulsion contains water. Suitably the emulsion comprises 25 to 85%, preferably from 40 to 70%, more preferably from 45 to 60% water by weight of the total emulsion.

Silicone is present in the oil-in-water emulsion. The silicone is a conditioning agent intended to deposit onto hair remaining behind after rinsing of the hair with water.

The particle size of the silicone ($D_{3,2}$) droplet within the water in oil emulsion is preferably from 10 nm to 10 microns, more preferably having a $D_{3,2}$ mean droplet diameter from 50 nm to 5 microns, most preferably from 100 nm to 5 microns. $D_{3,2}$ means the droplet diameter may be measured by means of a laser light scattering technique, for example using a 2600D Particle Sizer from Malvern Instruments.

The typical level of the silicone is from 0.1 to 17% by weight of the total composition, preferably from 0.5 to 13 wt %, more preferably from 1 to 10 wt %.

Typical silicones may include polyalkyl siloxanes, polyaryl siloxanes, polyalkylaryl siloxanes, polyether siloxane copolymer and mixtures thereof.

The silicone may comprise a functionalized silicone. Suitable functionalized silicones include, for example, hydroxyl-, amino-, carboxy-, betaine-, quaternary ammonium-, carbohydrate-, hydroxy- and alkoxy-substituted silicones. The functionalized silicone may also contain multiple substitutions. Preferably, the functionalized silicone is an amino silicone, especially if the piroctone compound is to be solubilized in the silicone.

Amino silicones are described in EP455185 and include trimethylsilylamodimethicone as depicted below, and are sufficiently water insoluble so as to be useful in the emulsion:

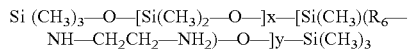

wherein x+y is a number from about 50 to about 500, and the weight percent amine functionality is from about 0.03% to about 8%, and wherein $R_6$ is an alkylene group having from 2 to 5 carbon atoms. Preferably, the number x+y is from 100 to 300, and the weight percent amine functionality is from about 0.5% to 4%. As expressed herein, the weight percent amine functionality is measured by titrating a sample of the amino silicone against alcoholic hydrochloric acid to the bromocresol green end point. The weight percent amine is calculated using a molecular weight of 45 (corresponding to $CH_3$—$CH_2$—$NH_2$).

If the piroctone compound is present as a solution within the silicone of the water-in-oil emulsion amino silicones are preferred silicones.

By amino silicone is meant a silicone containing at least one primary, secondary or tertiary amine group, or a quaternary ammonium group. An example of a commercially available amino silicone useful in the emulsion of the invention is DC 2-8566 available from Dow Corning (INCI: dimethyl, methyl (aminoethylaminoisobutyl) siloxane). Examples of suitable amino silicones include polysiloxanes having the CTFA designation 'amodimethicone'. Specific examples of amino functional silicones suitable for use in the invention are the amino silicones DC8220, DC8166, DC8466, and DC8950-114, MEM1788 and MEM7128 (all ex. Dow Corning) and GE 1149-75 (ex. General Electric Silicones). Suitable quaternary silicone polymers are described in EP0530974A. A preferred quaternary silicone is K3474 (ex. Goldschmidt).

It is also possible to use a blend of amino and non-amino silicones.

It is preferable if at least 50 wt % of the total silicone in the composition is present in the emulsion, more preferably at least 75 wt %.

The viscosity of the silicone or silicone blend in isolation from the rest of the composition is suitably from 200-500,000 mm²/second at 25° C., preferably from 500-100,000, more preferably from 700-50,000, still more preferably from 1000-10,000, measured by Brookfield LVF, spindle3, 30 rpm, 1 minute.

The oil-in-water emulsion may further comprise an emulsifier, preferably a nonionic surfactant. The typical level of the emulsifier is from 0.01 to 5% by weight of the total composition, preferably from 0.05 to 2.5 wt %, more preferably from 0.1 to 1.5 wt %. The typical level of the emulsifier is from 0.1 to 20% by weight of the total emulsion, preferably from 0.5 to 10 wt %, more preferably from 1 to 7.5 wt %. Suitably, the weight ratio of the emulsifier to silicone is 1:1 to 1:50, preferably from 1:2 to 1:20, more preferably from 1:5 to 1:15.

The nonionic surfactant suitable to act as emulsifier may include polyethylene glycol (PEG) compound, for example, trimethylnonylpolyethylene glycol (trade name Tergitol TMN-6, ex. Dow Chemical or Sigma-Aldrich).

The weight ratio of the piroctone compound to silicone in the oil-in-water emulsion is preferably from 20:1 to 1:20, preferably from 1:15 to 15:1, more preferably from 1:10 to 10:1.

Cationic Polymer

A cationic polymer comprising a dimethyl diallyl ammonium moiety is an essential feature of the invention.

Preferred cationic polymers are homo or copolymers where a dimethyl diallyl ammonium moiety is one of the monomers. More preferred cationic polymers are polyquaternium-6, polyquaternium-7 and polyquaternium-22 A particularly preferred cationic polymer is polyquaternium-6.

Typically, the cationic polymer is present at a level of from 0.01 to 5% by weight of the total composition, preferably from 0.05 to 2 wt %, more preferably from 0.1 to 1 wt %.

In a preferred embodiment, the weight ratio of cationic polymer to anti-dandruff agent 0.6:1 or more, conveniently 0.7:1 or more, conveniently 0.8:1 or more, conveniently 0.9:1 or more. In other preferred embodiments, the weight ratio of cationic polymer to antidandruff agent is 1:1 or more, conveniently 1.05:1 or more, conveniently 1.10:1 or more. In a preferred embodiment the cationic polymer is polyquaternium-6; in a further preferred embodiment the antidandruff agent is at least 50 wt % piroctone olamine. In a further preferred embodiment, the composition comprises polyquaternium-6 and piroctone olamine, in a weight ratio of 0.6:1 or more, conveniently 0.7:1 or more, conveniently 0.8:1 or more, conveniently 0.9:1 or more. In other embodiments conveniently the weight ratio of cationic polymer (e.g. polyquaternum-6) to anti-dandruff agent (e.g. piroctone olamine) is 1:1 or more, conveniently in a weight ratio of 1.05:1 or more.

Conveniently the weight ratio of cationic polymer to piroctone compound is no more than about 3:1, preferably no more than about 2:1, and in some embodiments no more than about 1.75:1.

Additional cationic deposition polymers may be included, but they are not preferred. Other cationic polymers include polygalactomannans and polysaccharide polymers, such as cationic cellulose derivatives and cationic starch derivatives.

Suspending Agent

Suspending agent is a preferred feature of the composition. Suitable suspending agents are selected from polyacrylic acids, cross-linked polymers of acrylic acid, copolymers of acrylic acid with a hydrophobic monomer, copolymers of carboxylic acid-containing monomers and acrylic esters, cross-linked copolymers of acrylic acid and acrylate esters, heteropolysaccharide gums and crystalline long chain acyl derivatives. The long chain acyl derivative is desirably selected from ethylene glycol stearate, alkanolamides of fatty acids having from 16 to 22 carbon atoms and mixtures thereof. Ethylene glycol distearate and polyethylene glycol 3 distearate are preferred long chain acyl derivatives, since these impart pearlescence to the composition. Polyacrylic acid is available commercially as Carbopol 420, Carbopol 488 or Carbopol 493. Polymers of acrylic acid cross-linked with a polyfunctional agent may also be used; they are available commercially as Carbopol 910, Carbopol 934, Carbopol 941 and Carbopol 980. An example of a suitable copolymer of a carboxylic acid containing monomer and acrylic acid esters is Carbopol 1342. All Carbopol (trade mark) materials are available from Goodrich. Suitable cross-linked polymers of acrylic acid and acrylate esters are Pemulen TR1 or Pemulen TR2. A suitable heteropolysaccharide gum is xanthan gum, for example that available as Kelzan mu.

Mixtures of any of the above suspending agents may be used. Preferred is a mixture of cross-linked polymer of acrylic acid and crystalline long chain acyl derivative.

A most preferred example is a crosslinked polyacrylate polymer.

Suspending agent, if included, will generally be present in a shampoo composition of the invention at levels of from 0.01 to 5 wt. %, preferably from 0.1 to 2.5 wt. %, more preferably from 0.25 to 1 wt. %.

The viscosity of the composition suitably ranges from 3,000 to 10,000 mPa·s, preferably from 4,000 to 8,000 mPa·s, more preferably from 5,000 to 7,000 mPa·s when measured using a Brookfield V2 viscometer (spindle RTV5, 1 minute, 20 rpm) at 30° C.

The pH of the composition of the invention preferably ranges from 3 to 9, more preferably from 4 to 7, still more preferably from 4.5 to 6.5.

In a particularly preferred embodiment of the invention, there is provided hair treatment composition comprising:
i) a cleansing phase comprising a surfactant, in which at least 50 wt % of the total surfactant comprises an ethoxylated alkyl sulphate anionic surfactant, the cleansing phase comprising an alkyl sulphate and/or ethoxylated alkyl sulphate anionic surfactant present at level of 8 to 15% by weight of the total composition; and a betaine surfactant, preferably an alkyl amidopropyl betaine, at a level of 1 to 5% by weight of the total composition;
ii) an oil-in-water emulsion comprising a silicone;
iii) a piroctone compound; and
iv) a cationic polymer in which the cationic polymer comprises a dimethyl diallyl ammonium moiety
in which the anti-dandruff agent component in the composition is less than 50 wt % in solid form.

Conveniently, the weight ratio of the cationic polymer to the piroctone compound is 0.6:1 or more, conveniently 1:1 or more. In certain embodiments, the composition may be free of solid anti-dandruff agent, such as zinc pyrithione. Conveniently, the piroctone compound is piroctone olamine. Preferably, the cationic polymer is polyquaternium-6. Conveniently, the silicone is an amodimethicone.

Other Optional Components

The composition may optionally comprise one or more components for use in hair treatment products, provided that the optional components are physically and chemically compatible with the essential components described hereinbefore, and do not otherwise unduly impair sensory, formulation rheology and conditioning performance. Individual concentrations of such optional components may range from 0.001% to 10% by weight of the total composition, preferably from 0.01% to 5% wt %. Such components may include fragrance, dyes, and pigments, pH adjusting agents, pearlescers or opacifiers, viscosity modifiers, preservatives, and natural hair nutrients such as botanicals, fruit extracts, sugar derivatives and amino acids. The composition may comprise an additional silicone which is not in the oil-in-water emulsion phase. The additional silicone may be the same or different from the silicone comprised in the emulsion phase.

The composition may also comprise additional antidandruff and/or anti-microbial agents such as pyridinethione salts, pine tar, sulfur, salicylic acid, azoles, selenium sulfide, or mixtures thereof.

Method of Use

The composition is used in a manner for treating a surface. An effective amount of the composition is applied to a desired surface selected from hair and/or scalp, that has been preferably wetted with water. The composition may be allowed to stay on the surface for a given time for it to take effect, preferably combined with massaging, before being rinsed off with water. The given time is preferably from 20 seconds to 2 minutes, more preferably from 30 seconds to 1 minute. The effective amount typically ranges from 1 g to 20 g, preferably from 2.5 g to 10 g.

The present invention may be illustrated by the following non-limiting examples.

EXAMPLES

The following Examples were prepared

TABLE 1

| | Example | | | | | | | | | | | | | | | |
|---|---|---|---|---|---|---|---|---|---|---|---|---|---|---|---|---|
| | 1 | 2 | 3 | 4 | A | B | C | D | E | F | G | H | I | K | L | M |
| | Wt % | | | | | | | | | | | | | | | |
| Sodium laureth sulphate | 13 | 13 | 13 | 13 | 13 | 13 | 13 | 13 | 13 | 13 | 13 | 13 | 13 | 13 | 13 | 13 |
| Cocoamidopropyl Betaine | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Dimethiconol/TEA-dodecylbenzene sulfonate | 2 | 2 | 2 | 2 | 2 | 2 | 2 | 2 | 2 | 2 | 2 | 2 | 2 | 2 | 2 | 2 |
| Carbomer | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Perfume | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Piroctone olamine | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Guar | | | | | 0.05 | 0.1 | 0.2 | 0.5 | | | | | | | | |
| Guar Hydroxypropyltrimonium Chloride | | | | | | | | | 0.05 | 0.1 | 0.2 | 0.5 | | | | |
| Polyquaternium-10 | | | | | | | | | | | | | 0.05 | 0.1 | 0.2 | 0.5 |
| Polyquaternium-6 | 0.05 | 0.1 | 0.2 | 0.5 | | | | | | | | | | | | |
| Water and minors | To 100 | To 100 | To 100 | To 100 | To 100 | To 100 | To 100 | To 100 | To 100 | To 100 | To 100 | To 100 | To 100 | To 100 | To 100 | To 100 |

0.1 g of Example composition/g hair was applied evenly over a hair switch. Hair switches were washed twice. Once washed, switches were placed in drying cabinet (50° C.) until dry. Once dry, the switch was transferred to a jar containing 10 ml of ethanol. The jar was sealed and placed on a bottle roller for a fixed time. Using a syringe, an appropriately sized sample for analysis was removed from jar, and filtered through a syringe filter into a vial for analysis, using HPLC-UV methodologies, against a set of standards containing known amounts of Octopirox in ethanol (µg/ml).

TABLE 2

Octopirox Deposition

| | Example | | | | | | | | | | | | | | |
|---|---|---|---|---|---|---|---|---|---|---|---|---|---|---|---|
| | 1 | 2 | 3 | 4 | A | B | C | D | E | F | G | H | I | K | L | M |
| Octopirox deposition (ppm) | 6.2 | 7.8 | 10.3 | 16.8 | 6.6 | 6.4 | 6.8 | 7.0 | 6.4 | 4.6 | 7.3 | 7.6 | 4.4 | 5.5 | 6.7 | 6.2 |
| Std Dev | 1.2 | 1.6 | 2.1 | 3.1 | 0.9 | 2.0 | 1.8 | 1.9 | 1.9 | 0.3 | 1.3 | 1.7 | 1.6 | 1.5 | 2.1 | 3.1 |

The Examples of the invention deposit Octopirox onto the hair more effectively than the comparative Examples.

Example 2

A shampoo composition comprising (by weight of the composition) 13.0% sodium laureth sulphate, 1.5% cocamidopropyl betaine, 2.0% DC1788 silicone emulsion, 0.4% Carbopol 980, 0.75% perfume, 0.5% piroctone olamine, water to 100% and preservatives, citric acid and sodium hydroxide to specification, was tested for piroctone olamine deposition with a range of deposition polymers at the levels stated below. The amounts stated are for ppm deposition, with the standard deviation in brackets:

| Polymer level in formulation (wt %) | Guar C13 | Guar C17 | Polymer JR30M | Polyquaternium-6 |
|---|---|---|---|---|
| 0 | 5.680 (1.207) | 5.680 (1.207) | 5.680 (1.207) | 5.680 (1.207) |
| 0.05 | 6.585 (0.860) | 6.426 (1.942) | 4.416 (0.785) | 6.286 (1.625) |
| 0.1 | 6.406 (1.980) | 4.645 (0.285) | 5.481 (0.742) | 7.808 (1.535) |
| 0.2 | 6.863 (1.841) | 7.291 (1.263) | 6.694 (1.794) | 10.315 (2.075) |
| 0.5 | 6.993 (1.925) | 7.579 (1.656) | 6.237 (1.224) | 16.850 (3.077) |

The deposition of piroctone olamine with Polyquaternium-6 as the deposition polymer is relatively high compared to other polymers, but also beneficially demonstrates a dose response.

The invention claimed is:

1. A hair treatment composition comprising:
    i) a cleansing phase comprising a surfactant, in which at least 50 wt % of the total surfactant comprises an ethoxylated alkyl sulphate anionic surfactant, wherein the ethoxylated alkyl sulphate anionic surfactant is sodium laureth sulphate;
    ii) an oil-in-water emulsion comprising a silicone, wherein the oil-in-water emulsion comprises from 45 to 60% water by weight of the total emulsion;
    iii) a piroctone compound antidandruff agent at a level of 0.1 to 1.5 wt % of the composition; and
    iv) a cationic polymer in which the cationic polymer comprises polyquaternium-6 or polyquaternium-7, wherein the weight ratio of cationic polymer to antidandruff agent is 0.7:1 to 2:1;
    wherein the anti-dandruff agent component in the composition is less than 50 wt % in solid form.

2. The hair treatment composition according to claim 1 wherein the level of the piroctone compound is from 0.1 to 20% by weight of the total emulsion.

3. The hair treatment composition according to claim 1 in which the cationic polymer (iv) is polyquaternium-6.

4. The hair treatment composition according to claim 1 claim in which the silicone is aminosilicone.

5. The hair treatment composition according to claim 1 in which the piroctone compound antidandruff agent is piroctone olamine.

6. The hair treatment composition according to claim 1 wherein none of the anti-dandruff agent in the composition is in solid form.

7. The hair treatment composition according to claim 1 that is a shampoo.

8. The hair treatment composition according to claim 1 that comprises surfactant at a level from 3 to 45 wt % of the total composition.

9. The hair treatment composition according to claim 8, comprising surfactant at a level from 5 to 25 wt % of the total composition.

10. The hair treatment composition according to claim 8, comprising surfactant at a level from 7 to 20 wt % of the total composition.

11. A non-therapeutic method of treating hair or the scalp, comprising application of a hair treatment composition according to claim 1, to the hair or scalp.

12. The non-therapeutic method according to claim 11 in which the composition is washed off after use.

* * * * *